(12) United States Patent
Ricco

(10) Patent No.: US 6,748,931 B2
(45) Date of Patent: Jun. 15, 2004

(54) SYSTEM AND METHOD FOR FEEDING LPG TO AN INTERNAL COMBUSTION ENGINE

(75) Inventor: Mario Ricco, Orbassano (IT)

(73) Assignee: C.R.F. Societa Consortile per Azioni, Turin (IT)

(*) Notice: Subject to any disclaimer, the term of this patent is extended or adjusted under 35 U.S.C. 154(b) by 49 days.

(21) Appl. No.: 10/244,675

(22) Filed: Sep. 17, 2002

(65) Prior Publication Data

US 2003/0051711 A1 Mar. 20, 2003

(30) Foreign Application Priority Data

Sep. 18, 2001 (IT) ..................... TO2001A0887

(51) Int. Cl.⁷ ............................... F02B 43/00
(52) U.S. Cl. ..................... 123/527; 123/495
(58) Field of Search ................. 123/527, 495

(56) References Cited

U.S. PATENT DOCUMENTS 5,343,847 A * 9/1994 Chasteen et al. ........... 123/527
5,367,999 A * 11/1994 King et al. ................. 123/458

* cited by examiner

*Primary Examiner*—Thomas Denion
*Assistant Examiner*—Zelalem Eshete
(74) *Attorney, Agent, or Firm*—Sughrue Mion, PLLC

(57) ABSTRACT

A LPG fuel system for an internal combustion engine, including a LPG fuel tank and a pump immersed in the fuel tank and driven by an electric motor, the pump being kept constantly running when the temperature is below 0° C. or above 80° C., whilst the supply voltage of the electric motor driving the pump is chopper-controlled when the temperature is between the two said values.

2 Claims, 2 Drawing Sheets

SYSTEM AND METHOD FOR FEEDING LPG TO AN INTERNAL COMBUSTION ENGINE

BACKGROUND OF THE INVENTION

The present invention relates to LPG fuel injection systems for internal combustion engines.

Fuel systems of this type are already known, as in European Patent EP-B-0 725 205 of the same Applicant and the corresponding U.S. Pat. No. 5,592,924. Additional patents relative to this field are patent EP-B-0 922 851, also of the same Applicant, and the corresponding U.S. Pat. No. 6,050,237.

According to the known technique, fuel systems of this type include:
- a LPG fuel tank,
- a number of injectors associated with the engine's cylinders, for injecting liquid LPG into these cylinders,
- a fuel manifold or rail for feeding LPG to the said injectors,
- a line for feeding LPG from the fuel tank to the said rail,
- a return line for returning LPG fed in excess to the injectors back to the fuel tank,
- sensors for the level of LPG in the fuel tank,
- a pump immersed in the fuel tank for delivering LPG via the LPG fuel line, and
- an electric motor driving the pump.

The object of this invention is that of realizing a fuel system and method that, on the one hand, ensures that the fuel pump delivers the correct head and the correct flow rate under all engine running conditions, whilst on the other hand also ensuring a long operating life for the pump itself.

SUMMARY OF THE INVENTION

In order to achieve this objective, the object of the invention is a LPG fuel system having all of the above-indicated characteristics and also characterized in that the said system includes electronic means of pump control, a pressure sensor and/or temperature sensor inside the fuel tank, and by the fact that the said electronic means are programmed to:
- keep the pump constantly running when the temperature in the fuel tank is below 0° C. or above 80° C.,
- realize a chopper control on the voltage supply to the electric motor driving the pump when the temperature in the fuel tank is between 0° C. and 80° C.

In low-temperature engine running conditions, that is below 0° C., low vapour pressure is registered for the LPG inside the fuel tank. The pump must provide the correct head to correctly feed the injectors (which typically require a 2-bar pressure hike). The electronic means take care of keeping the pump constantly running, controlling the supply current in order to guarantee the required head.

In high-temperature engine running conditions, that is above 80° C., high vapour pressure is registered for the LPG inside the fuel tank, with the presence of vapour bubbles. In order to be sure that the LPG is always in the liquid state when injected into the engine's cylinders, it is necessary that the pump delivers high flow, eliminating the vapour bubbles. The electronic means thus take care of keeping the pump constantly running, controlling the voltage in order to guarantee the pump's power supply, thereby assuring the necessary flow rate. Always in accordance with the invention, under normal temperature conditions, that is between 0° C. and 80° C., the pump is not kept constantly running. In the case of a 100 HP internal combustion engine for example, a 60 1/hr LPG flow rate is required for feeding the injectors. When fed with a 12-volt supply, a typically used pump in a fuel system of this type is capable of guaranteeing a flow rate of 120 1/hr. A chopper control of the voltage can therefore be applied in such conditions to guarantee, on the one hand, feeding the injectors at an adequate flow rate and, on the other, maintaining the current absorbed by the pump at lower average values that prolong the useful lifetime of the motor-pump group.

BRIEF DESCRIPTION OF THE DRAWINGS

Further characteristics and advantages of the invention will become clear from the description that follows with reference to the enclosed drawings, supplied purely by way of a non-limitative example, where.

DETAILED DESCRIPTION OF THE INVENTION

Figure 1:
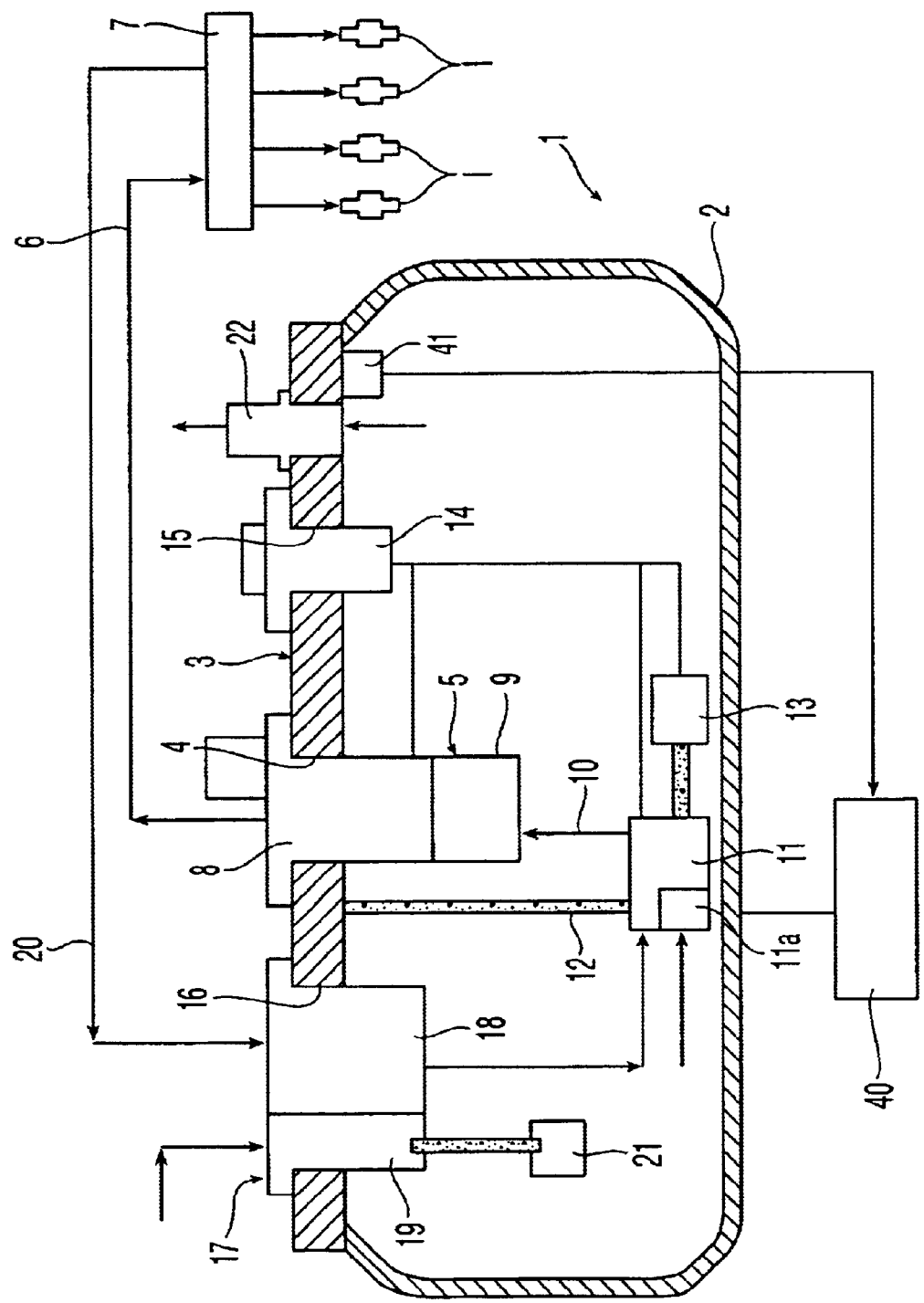
FIG. 1 is a schematic view of a LPG fuel system modified according to the precepts of the invention.

In FIG. 1, item 1 indicates a LPG fuel tank in its entirety, realized according to known technology, for delivering LPG to a number of injectors I associated with the various cylinders of the engine. The fuel tank 1 presents a hollow structure 2, realized so as to guarantee sealing under the planned running conditions for the type of installation under discussion. The hollow structure 2 presents an upper aperture closed by a service flange 3 carrying various connecting elements linking the fuel tank to the fuel system. For this purpose, the fuel tank 1 realized according to known technology presents a first through opening 4, through which the structure of a group 5 is mounted, the latter being connected to a line 6 for delivering LPG to an inlet manifold or rail 7, which distributes the LPG to the various injectors I. The group 5 includes a solenoid shut-off valve 8, destined to close itself and cut the fuel tank off to the outside in predetermined emergency conditions, together with a flow restrictor valve 9. The group 5 receives LPG via the line 10 from a pump 11 driven by an electric motor 11a, the structure of which is connected to the service flange 3 via a connection element 12. Notwithstanding, mounting of the pump 11 can also be accomplished in any other manner. A LPG level sensor device 13 is also connected to the structure of the pump 11. The electrical power supply to the solenoid valve 8, the pump 11 and the sensor 13 is provided via an electrical connector 14, which is mounted through a through opening 15 of the service flange 3. The latter also presents an additional through opening 16, inside which a group 17, including two valves 18 and 19, is mounted. Valve 18 is a return valve, which is connected to a line 20 for returning LPG delivered in excess to the rail 7 back to the fuel tank. Valve 19 is the valve used for filling the fuel tank and is associated with an additional level sensor 21. A safety valve 22 is also associated with the flange 3 to prevent pressure inside the fuel tank exceeding a predetermined threshold.

FIG. 1 shows a traditional fuel tank configuration in which the flange 3 presents through openings, through which the various above-described components pass. This invention could also be embodied using a fuel tank having an innovative structure that formed the object of previous Italian patent application n° TO2001A000360, filed by the same Applicant, in which at least some of the aforementioned components are fixed to the lower surface of the plate, without passing through it.

In accordance with the invention, operation of the electric motor 11a driving the pump 11 is controlled by electronic means of control 40 (schematically illustrated in FIG. 1) on the basis of the signal received from a pressure and/or temperature sensor 41. By way of example, the sensor 41 has been schematically illustrated as being located inside the fuel tank, Naturally, a different location for the sensor could also be provided.

Figure 2:
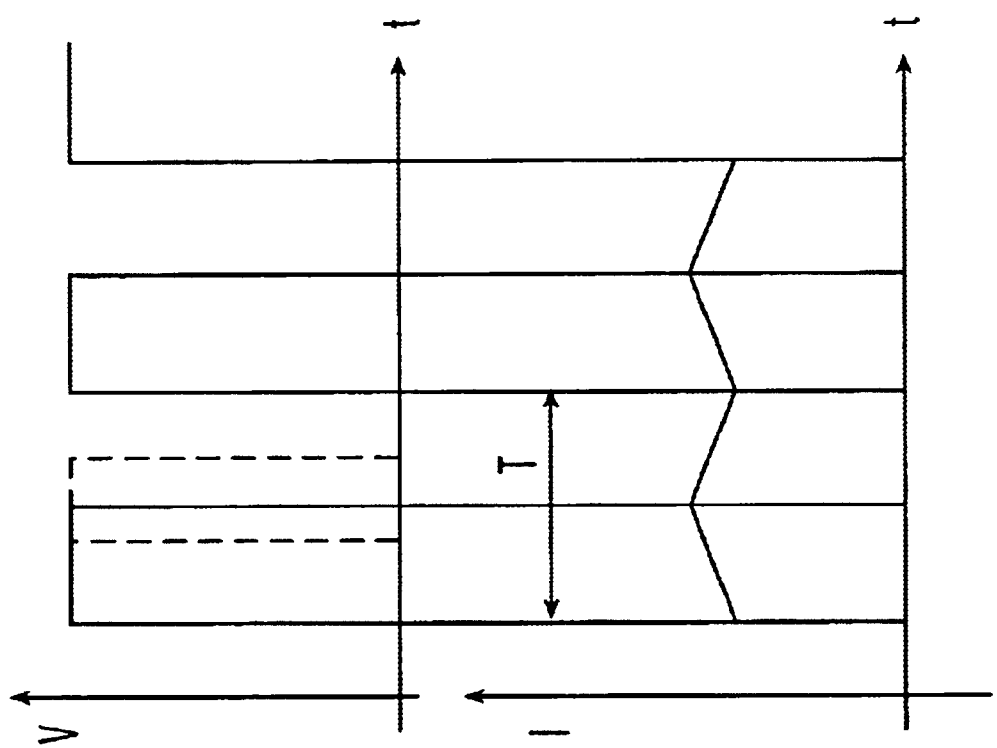
FIG. 2 illustrates the voltage variation diagrams of the power supply to the electric motor driving the pump during chopper-control in the normal running phases.

In accordance with the invention, when the temperature of the LPG in the fuel tank is below 0° C. or above 80° C., the pump is kept constantly running, as described in the foregoing, thereby guaranteeing the correct head and the correct flow-rate of LPG under all operating conditions. Vice versa, under normal running conditions, or rather for temperatures ranging between the two said values, chopper control is performed on the supply voltage to the pump according to that illustrated in the diagram shown in FIG. 2. In this figure, the upper part indicates the variation in supply voltage. As can be seen, in each time period T, the voltage is only kept at its supply value for a fraction of this period, while the voltage drops to zero in the remaining part. Correspondingly (lower part of FIG. 2), the supply current varies cyclically between a minimum value and a maximum value, maintaining a relatively low average value that permits the useful life of the pump's drive motor to be extended.

Naturally, the principle of the invention being understood, the constructional details and forms of embodiment could be extensively changed with respect to that described and illustrated by way of example without leaving the scope of this invention.

What is claimed is:

1. A LPG fuel injection system for an internal combustion engine, including:
   a LPG fuel tank,
   a number of LPG injectors associated with the engine's cylinders, for injecting liquid LPG into these cylinders,
   a manifold or rail for feeding LPG to the said injectors,
   a line for feeding LPG from the fuel tank to the said rail,
   a return line for returning LPG fed in excess to the injectors back to the fuel tank,
   sensors for the level of LPG in the fuel tank,
   a pump immersed in the fuel tank for delivering LPG via the LPG fuel line, and
   an electric motor driving the pump,
   wherein the said system includes electronic means of control for the electric motor driving the pump, as well as a pressure and/or temperature sensor inside the fuel tank, and by the fact that the said electronic means of control are programmed to:
      keep the pump constantly running when the temperature in the fuel tank is below 0° C. or above 80° C.,
      realize a chopper control on the voltage supply to the electric motor driving the pump when the temperature in the fuel tank is between 0° C. and 80° C.

2. A LPG fuel distribution process in an internal combustion engine, in which the following are arranged:
   a LPG fuel tank,
   a number of LPG injectors associated with the engine's cylinders,
   a manifold or rail for feeding LPG to the said injectors,
   a line for feeding LPG from the fuel tank to the said rail,
   a return line for returning LPG fed in excess to the injectors back to the fuel tank,
   sensors for the level of LPG in the fuel tank,
   a pump immersed in the fuel tank for delivering LPG via the LPG fuel line, and
   an electric motor driving the pump,
   wherein the said pump is kept constantly running when the temperature in the fuel tank is below 0° C. or above 80° C., and by the fact that a chopper control is applied to the supply voltage of the electric motor driving the pump when the temperature in the fuel tank is between the two said values.

* * * * *